United States Patent
Tsai et al.

(10) Patent No.: US 11,586,254 B2
(45) Date of Patent: Feb. 21, 2023

(54) FLEXIBLE KEYBOARD APPARATUSES

(71) Applicant: Hewlett-Packard Development Company, L.P., Spring, TX (US)

(72) Inventors: Cheng-Han Tsai, Taipei (TW); Wen-Hua Ni, Taipei (TW); Chi Chun Chiang, Taipei (TW); Hung-Yen Chi, Taipei (TW)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/419,748

(22) PCT Filed: Jul. 30, 2019

(86) PCT No.: PCT/US2019/044059
§ 371 (c)(1),
(2) Date: Jun. 30, 2021

(87) PCT Pub. No.: WO2021/021117
PCT Pub. Date: Feb. 4, 2021

(65) Prior Publication Data
US 2022/0147110 A1    May 12, 2022

(51) Int. Cl.
*G06F 3/16* (2006.01)
*G06F 1/16* (2006.01)
*G06F 3/02* (2006.01)

(52) U.S. Cl.
CPC .......... *G06F 1/1667* (2013.01); *G06F 1/1679* (2013.01); *G06F 3/0221* (2013.01)

(58) Field of Classification Search
CPC ..... G06F 1/1667; G06F 1/1679; G06F 3/0221
See application file for complete search history.

(56) References Cited

U.S. PATENT DOCUMENTS

| | | | |
|---|---|---|---|
| 7,567,432 B1 | 7/2009 | Tabasso et al. | |
| 8,599,542 B1 | 12/2013 | Healey et al. | |
| 9,116,550 B2 | 8/2015 | Siddiqui et al. | |
| 9,600,034 B2 | 3/2017 | Kiple et al. | |
| 9,795,213 B1* | 10/2017 | Vier | G06F 3/0231 |
| 2005/0238405 A1 | 10/2005 | Chapman et al. | |

(Continued)

FOREIGN PATENT DOCUMENTS

JP    2013-025420 A    2/2013

OTHER PUBLICATIONS

UnTech Foldable Wireless Bluetooth Keyboard with Kickstand F18 for iPh-untech, Apr. 1, 2019, 14 pages.

*Primary Examiner* — Towfiq Elahi
(74) *Attorney, Agent, or Firm* — Knobbe, Martens, Olson & Bear, LLP

(57) ABSTRACT

An example apparatus includes a first flexible portion connected to a second flexible portion. The first flexible portion includes a keyboard having a set of input keys disposed thereon and circuitry coupled to the set of input keys, the first flexible portion is to couple to a portable computing device proximal to a display side of the portable computing device. The second flexible portion has a plurality of fasteners to couple to a kickstand of the portable computing device, the first and second flexible portion to provide an opposing force there between while the kickstand is disposed at one of a plurality of variable support angles.

19 Claims, 6 Drawing Sheets

(56) References Cited

U.S. PATENT DOCUMENTS

| | | |
|---|---|---|
| 2013/0016468 A1 | 1/2013 | Oh |
| 2014/0139989 A1* | 5/2014 | Mori .................... G06F 1/1677 |
| | | 361/679.09 |
| 2015/0049423 A1 | 2/2015 | Hsu et al. |
| 2015/0055284 A1* | 2/2015 | Han ...................... F16M 11/38 |
| | | 361/679.12 |
| 2018/0081402 A1 | 3/2018 | Smith et al. |
| 2018/0364769 A1 | 12/2018 | Esmaeili et al. |

* cited by examiner

FLEXIBLE KEYBOARD APPARATUSES

BACKGROUND

Many computing devices are portable which allow for the computing devices to be used in mobile settings. As the portable computing devices are mobile, the devices may be used in a handheld manner and may not include an integrated keyboard. Attaching a keyboard device to the portable computing device may increase the ease of use and/or functionality of the portable computing device.

BRIEF DESCRIPTION OF FIGURES

Various examples may be more completely understood in consideration of the following detailed description in connection with the accompanying drawings, in which.

Figure 1:
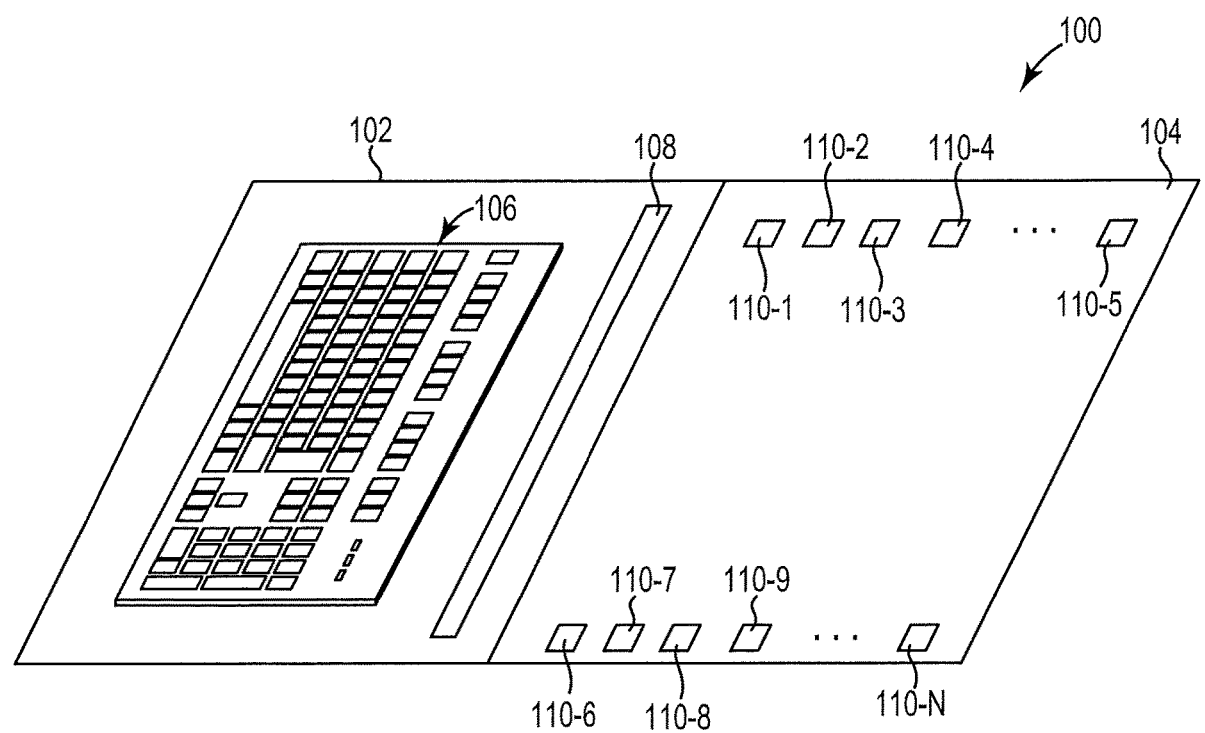
FIG. 1 illustrates an example apparatus including a flexible keyboard, in accordance with the present disclosure.

While various examples discussed herein are amenable to modifications and alternative forms, aspects thereof have been shown by way of example in the drawings and will be described in detail. It should be understood, however, that the intention is not to limit the disclosure to the particular examples described. On the contrary, the intention is to cover all modifications, equivalents, and alternatives falling within the scope of the disclosure including aspects defined in the claims. In addition, the term "example" as used throughout this application is by way of illustration, and not limitation.

DETAILED DESCRIPTION

Aspects of the present disclosure are believed to be applicable to a variety of different types of apparatuses, systems and methods involving a flexible keyboard that couples to a kickstand of a portable computing device, and more particularly involving coupling to the kickstand while the kickstand is disposed at one of a plurality of variable support angles. In certain implementations, aspects of the present disclosure have been shown to be beneficial when used in the context of an apparatus having a flexible keyboard apparatus that couples to the kickstand of the portable computing device and provides resistance to pressure applied to the portable computing device, and while the flexible keyboard is located on a non-flat surface. While not necessarily so limited, various aspects may be appreciated through the following discussion of non-limiting examples.

In the following description various specific details are set forth to describe specific examples presented herein. However, other examples and/or variations of these examples may be practiced without all the specific details given below. In other instances, features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or example may be combined with features of another figure or example even though the combination is not explicitly shown or explicitly described as a combination.

In accordance with various examples, an apparatus includes a flexible keyboard device which couples to a portable computing device such that the flexible keyboard device supports the portable computing device via tensile forces. In some specific examples, the flexible keyboard devices supports the portable computing device while the keyboard device is placed on a non-flat surface, such as the lap of the user. The flexible keyboard device includes a first flexible portion connected to a second flexible portion. The first flexible portion includes a keyboard having a set of input keys disposed thereon and circuitry coupled to the set of input keys. The first flexible portion is coupled to a portable computing device proximal to a display side of the portable computing device. The second flexible portion includes a plurality of fasteners to couple to a kickstand of the portable computing device. The first and second flexible portion may provide an opposing force there between while the kickstand is disposed at one of a plurality of variable support angles, thereby providing support to the portable computing device. In such examples, the kickstand acts as a skeleton backbone to the flexible keyboard device, and the opposing force may provide resistance to pressure or strikes to the portable computing device.

In specific examples, the second flexible portion includes an array of fasteners which selectively couple to the kickstand while disposed at the different support angles. For example, a first array of fasteners and a second array of fasteners may couple at different locations of the kickstand to provide a first opposing force and a second opposing force between the first flexible portion and the second flexible portion while the kickstand is disposed at a first support angle and a second support angle of a plurality of variable support angles. Different subsets of the first and second array of fasteners may couple to the kickstand when the kickstand is disposed at the first support angle and the second support angle. In such examples, the first and second opposing forces are proportional to a number of fasteners in the first array and the second array coupled to the kickstand.

Other related examples are directed to methods of using the above-described apparatuses having the flexible keyboard, as further described herein.

Turning now to the figures, FIG. 1 illustrates an example apparatus including a flexible keyboard, in accordance with the present disclosure. Various examples are directed to an apparatus and/or a device that includes a flexible keyboard device 100 which couples to a portable computing device.

As shown by FIG. 1, the apparatus includes a first flexible portion 102 connected to a second flexible portion 104. The first and second flexible portions 102, 104 may be formed of a variety of material, such as silicon rubber, acrylonitrile butadiene styrene, fabric, and other material. Each of the first and second flexible portions 102, 104 have a front side, a backside, a top, a bottom, and first and second perimeter edges. The first and second flexible portions 102, 104 are connected at the top of the first flexible portion 102 and at the bottom of the second flexible portion 104 to form the flexible keyboard device 100, and with the first and second flexible portions 102, 104 being contiguous.

The first flexible portion 102 includes a keyboard having a set of input keys 106 disposed thereon. The set of input keys 106 may be disposed on the front side of the first flexible portion 102. The keyboard includes circuitry coupled to the set of input keys 106. The keyboard may act as an input device. In specific examples, the circuitry of the keyboard includes a processor and a plurality of circuits which form a key matrix. The key matrix may include a grid of circuits located beneath the set of input keys 106 and/or capacitive circuits. The inputs keys act as switches to the circuits. For example, each circuit is broken at a point below the respective input key. When one of input keys is pressed, the circuit of the grid associated with the one input key is completed and which allows or causes current to flow. The current is recognized by a coupled processor as the respective input key is pressed. The processor determines which input key is pressed, such as by using a character map in a memory, such as in read-only memory, of the keyboard. The character map is a chart or lookup table which correlates the respective input keys with what the keystroke or combination of keystrokes represents, such as an alphabetic letter or a number. As an example, pressing the "a" input key may correspond to the lower case letter "a", whereas pressing the "a" input key with the "shift" input key may correspond to a capital letter "A".

In some examples, the switches of the keyboard are not mechanical. For example, the keyboard may include capacitive switches in which current is constantly flowing in the circuits of the key matrix. Each input key may be spring loaded and includes a capacitive plate. When a user presses a respective input key, in such examples, the plate of the input key moves closer to a capacitive plate of the circuit, and the amount of current flowing changes. In other examples, the set of input keys 106 may include or form part of a touch pad. For example, the touch pad may include one sensor or a plurality of sensors, such as an array of sensors. The sensors may be the same type or different types of sensors that detect a user input or touch. Non-limiting example sensors include but are not limited to pressure sensors, capacitive sensors, resistive sensors, textile-based sensors, accelerometers, and heat sensor.

The keyboard and/or the first flexible portion 102 further includes communication circuitry to communicate input data, response to user inputs via the set of input keys 106, to the portable computing device. The communication circuitry may include wireless communication circuitry or wired circuitry that couples to an input of the portable computing device.

The first flexible portion 102 further includes a mechanism for coupling to a portion of a portable computing device. The mechanism may include a connector 108 that pivotally couples to a portion of the display side of the portable computing device. For example, the connector 108 pivotally couples to a perimeter edge of the portable computing device. The computing device may couple proximal to the front side of the first flexible portion 102 and/or proximal to a display side of the portable computing device. The connector 108 pivotally couples to the portion of the portable computing device such that the portable computing device may pivot while remaining coupled to the connector 108 of the first flexible portion and while a kickstand of the portable computing device is disposed at a plurality of variable support angles, as further described herein.

The second flexible portion 104 includes a plurality of fastener 110-1, 110-2, 110-3, 110-4, 110-5, 110-6, 110-7, 110-8, 110-9 . . . 110-N (herein sometimes referred to as "the plurality of fasteners 110" for ease of reference). Although FIG. 1 illustrates ten fasteners, examples are not so limited and the plurality of fasteners 110 may include more or less than ten. As used herein, the fasteners include or refer to hardware that mechanically joins or affixes two or more objects, such as the second flexible portion 104 and the kickstand, together. In various examples, the fasteners 110 may be unattached or uncoupled from the kickstand without damaging the fasteners. Example fasteners include magnets, clips, vacuum cups, friction sources, such as tape or Velcro, buckles, clasps, buttons, hook-and-eye closures, snaps, among other types of fasteners. The plurality of fasteners 110 may couple to a kickstand of the portable computing device such that the first and second flexible portions 102, 104 provide an opposing force there between while the kickstand is disposed at one of a plurality of variable support angles. The first and second flexible portions 102, 104 are nonplanar responsive to the second flexible portion being coupled to the kickstand.

Figure 2A:
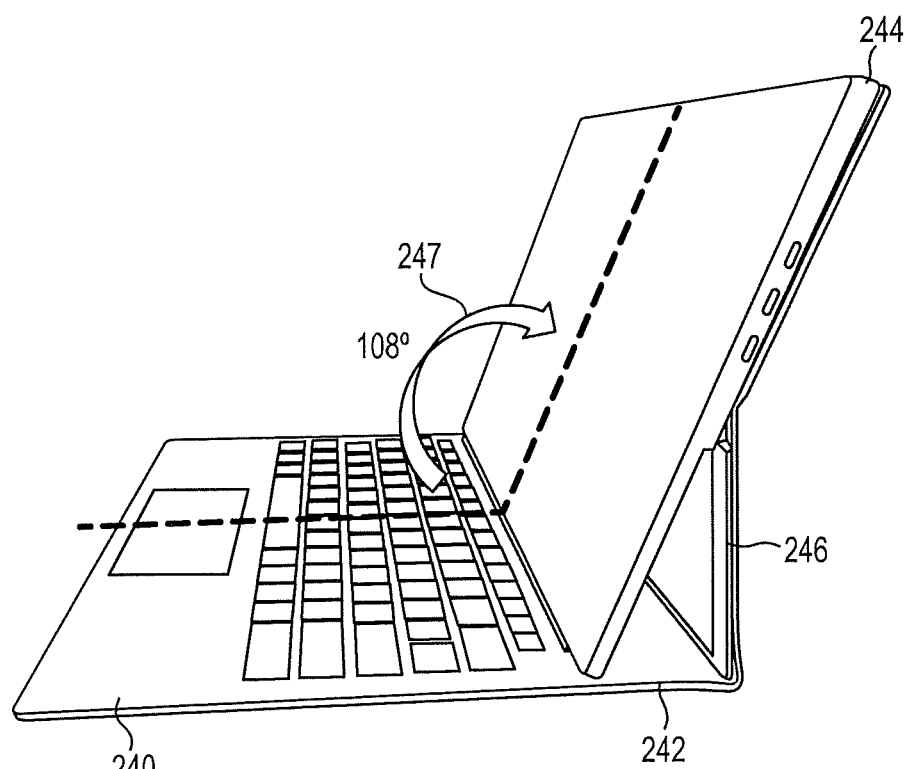
FIGS. 2A-2C illustrate an example flexible keyboard device coupled to a portable computing device, in accordance with the present disclosure
Figure 2B:
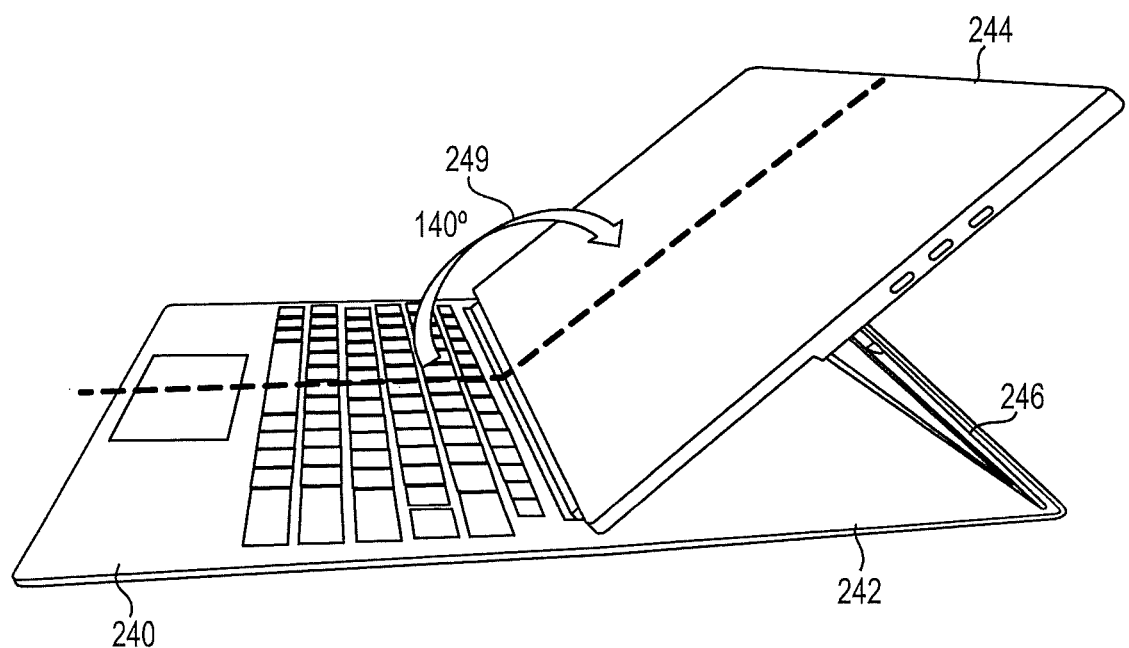
Figure 2C:
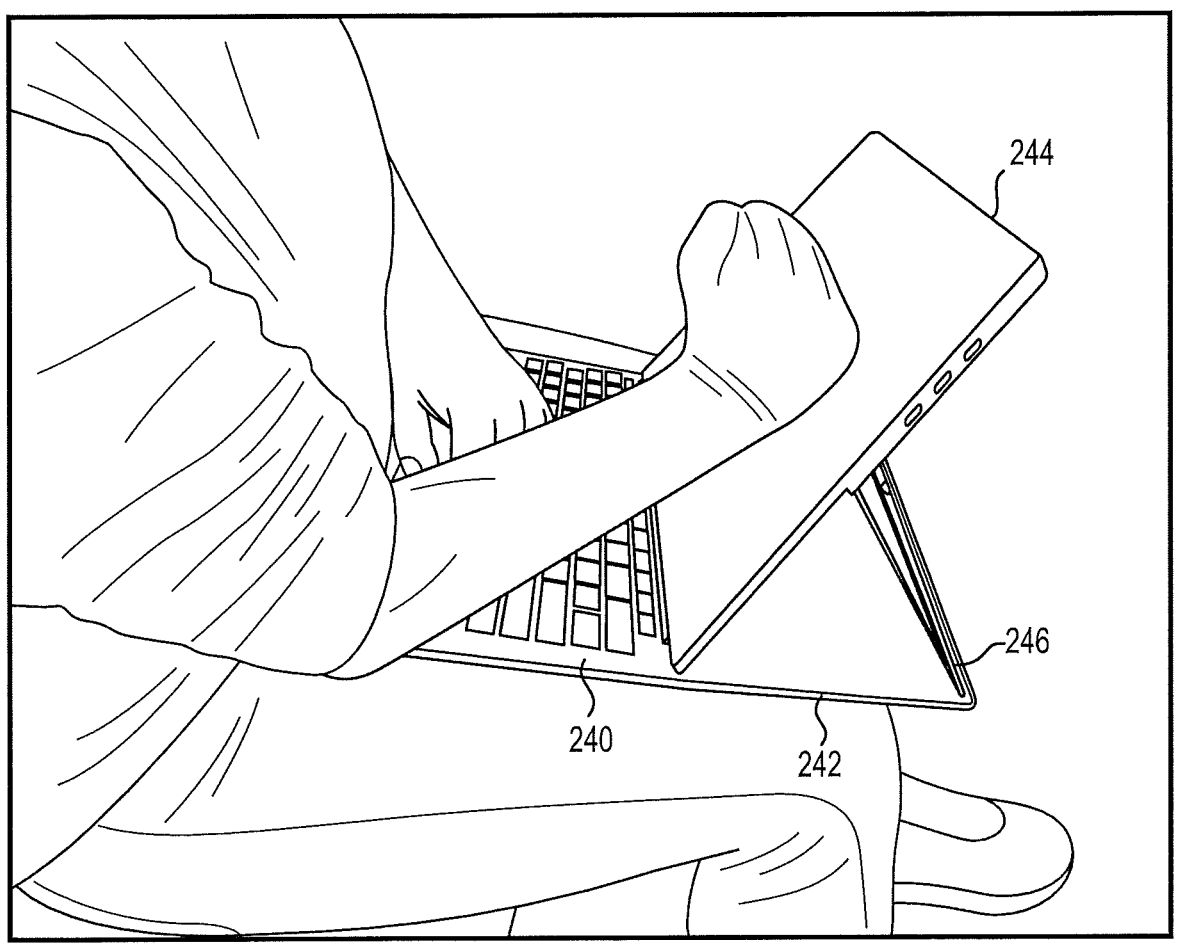

In various examples, the apparatus further includes the portable computing device, as further illustrated by FIGS. 2A-2C. The portable computing device includes or refers to a computing device including a processor, memory, and a graphical user interface which may be used in a mobile setting. The portable computing device may not include a keyboard. Example portable computing devices include a tablet, a mobile phone, an electronic reader, and a gaming and/or music device. In specific examples, the portable computing devices has a housing of a form and size to be carried and/or grasped by one or both hands of a user.

The portable computing devices has a kickstand that may be disposed at a plurality of variable support angles. Variable support angles, as used herein, include or refer to angles of the kickstand with respect to a back side of the portable computing device during which the kickstand provides mechanical support to the portable computing device. In various examples, the plurality of variable support angles provide support to the portable computing device such that the display side of the portable computing device is at a visible angle with respect to the flexible keyboard device 100. The kickstand may be disposed at an additional angle in which the kickstand is flat (or flush) against the backside of the portable computing device, with the backside being opposite the display side, such as zero degrees.

The second flexible portion 104 may couple to the kickstand while the kickstand is disposed at one (and/or multiple) of the plurality of variable support angles and to provide resistance to pressure on the portable computing devices. The resistance to pressure may be provided while the first flexible portion 102 is located on a non-flat surface. As a specific example, and further illustrated by FIG. 2C, a user may place the first flexible portion 102 on their lap and while coupled to the portable computing device via the connector 108 and the plurality of fasteners 110. The plurality of fasteners 110 are used to provide the opposing force between the first and second flexible portions 102, 104, such as a tensile force, and which provides resistance to pressure on the portable computing device and stabilizes the position of the portable computing device.

In the example illustrated by FIG. 1, the plurality of fasteners 110 include a first array of fasteners 110-1, 110-2, 110-3, 110-4, 110-5 located proximal to a first perimeter edge of the second flexible portion 104 and a second array of fasteners 110-6, 110-7, 110-8, 110-9, 110-N located proximal to a second perimeter edge of the second flexible portion 104. The first array and second array of fasteners, such as the plurality of fasteners 110, couple to the kickstand of the portable computing device at a plurality of locations to provide the opposing force and resistance to pressure while the kickstand is disposed at a first support angle and a second support angle of the plurality of variable support angles, such as illustrated further by FIGS. 2A-2B. In specific examples, the kickstand includes components to couple to the plurality of fasteners 110. As an example, the plurality of fasteners 110 include magnets and the kickstand includes magnetic plates which may couple to the magnets. Although examples are not so limited. As another example, the plurality of fasteners 110 may include vacuum cups and the kickstand includes a surface for the vacuum cups to couple to.

As a related and specific example, the second flexible portion 104 couples to the kickstand of the portable computing device while the kickstand is disposed at a first support angle and a second support angle of the plurality of variable support angles, and an additional angle in which the kickstand is flat against a backside of the portable computing device. The first array and second array of fasteners couple to the kickstand of the portable computing device at a plurality of locations. For example, the first and second array of fasteners 110-1, 110-2, 110-3, 110-4, 110-5, 110-6, 110-7, 110-8, 110-9, 110-N provide a first opposing force between the first flexible portion 102 and the second flexible portion 104 while coupled to kickstand and while the kickstand is disposed at the first support angle. The first and second array of fasteners 110-1, 110-2, 110-3, 110-4, 110-5, 110-6, 110-7, 110-8, 110-9, 110-N, such as first and second arrays of magnets, may provide a second opposing force between the first flexible portion 102 and the second flexible portion 104 while coupled to kickstand and while the kickstand is disposed at the second support angle. Different subsets of the first array and second array of fasteners may be coupled to the kickstand while disposed at the first and second support angles and/or at different locations of the kickstand and to provide a tensile force between the second flexible portion 104 and the first flexible portion 102.

The number of the plurality of fasteners 110 that couple to the kickstand may be dependent on the variable angle the kickstand is disposed at. For example, a first subset of the plurality of fasteners 110 are coupled to the kickstand while the kickstand is disposed at the first support angle of the plurality of variable support angles and a second subset of the plurality of fasteners 110 are coupled to the kickstand while the kickstand is disposed at the second support angle of the plurality of variable support angles. The first and second subsets of fasteners 110 may include different numbers of fasteners. In such examples, the opposing force provided is proportional to a number of fasteners of the plurality of fasteners 110 that are coupled to the kickstand. The user may use the flexible keyboard on non-flat surfaces, such as their lap, at more than one support angles and the flexible keyboard device provides support and stability to the portable computing device.

FIGS. 2A-2B illustrate an example flexible keyboard device coupled to a portable computing device, in accordance with the present disclosure. More specifically, the flexible keyboard device includes the first flexible portion 240 and the second flexible portion 242 connected together.

The first flexible portion 240 is coupled to a side of the portable computing device 244 proximal to a display side of the portable computing device and to a top of the first flexible portions via a connector. The connector couples to the side of the portable computing device 244 and allows for the portable computing device 244 to pivot to a plurality of angles. The second flexible portion 242 couples to a kickstand 246 of the portable computing device 244 via a plurality of fasteners. The first and second flexible portions 240, 242 are contiguous and are non-planar responsive to the second flexible portion 242 coupling to the kickstand 246.

The portable computing device 244 includes the display side having a graphical user interface and the backside having the kickstand 246. The kickstand 246, as further illustrated by FIG. 3B, has a first arm and a second arm coupled to the backside of the portable computing device 244 and to pivot about a hinge (or a plurality of hinges), and a crossbar coupled between the first arm and the second arm. The first arm and second arm may include metal plates, such as magnetic plates, to selectively couple to the plurality of fasteners of the second flexible portion 242. As a specific example, a first array and second array of fasteners of the second flexible portion 242 couple to the metal plates that are located within the first arm and the second arm of the kickstand 246.

In various examples, the first array and second array of fasteners couple to the kickstand 246 at a plurality of locations of the magnetic plates to provide the opposing force while the kickstand 246 is disposed at the plurality of variable support angles. For example, FIG. 2A illustrates the kickstand 246 at a first support angle of the plurality of variable support angles. In the specific example, the kickstand 246 is at the first support angle, the display side of the portable computing device 244 is provided at a first angle 247 with respect to the first flexible portion 240, such as 108 degrees. FIG. 2B illustrates the kickstand 246 at a second support angle of the plurality of variable support angles. In the specific example, the kickstand 246 is at the second support angle, the display side of the portable computing device 244 is provided at a second angle 249 with respect to the first flexible portion 240, such as 140 degrees. The first support angle may be approximately 18 degrees and the second support angle may be approximately 90 degrees, however examples are not so limited.

In a number of examples, the number of fasteners that are coupled to the kickstand 246 may change between variable support angles. For example, a first subset of the first array of fasteners and the second array of fasteners may be coupled to the kickstand 246 while the kickstand 246 is disposed at the first support angle as associated with the first angle 247 illustrated by FIG. 2A. And, a second subset of the first array of fasteners and the second array of fasteners may be coupled to the kickstand 246 while the kickstand 246 is disposed at the second support angle as associated with the second angle 249 illustrated by FIG. 2B. The opposing force provided, such as a first opposing force associated with the first support angle and a second opposing force associated with the second support angle, is proportional to a number of fasteners in the first subset and second subset of the first array and the second array coupled to the kickstand 246. Although the above describes two support angles, examples are not so limited and may include more than two variable support angles of the kickstand 246.

FIG. 2C illustrates a specific example of the flexible keyboard device coupled to the portable computing device 244 via the kickstand 246 and the first and second flexible portions 240, 242. As shown, the first flexible portion 240 may be located on a non-flat surface and the flexible keyboard device supports the portable computing device 244 by use of the opposing force provided between the first and second flexible portions 240, 242 and while the kickstand is at one of the plurality of variable support angles.

Figure 3A:
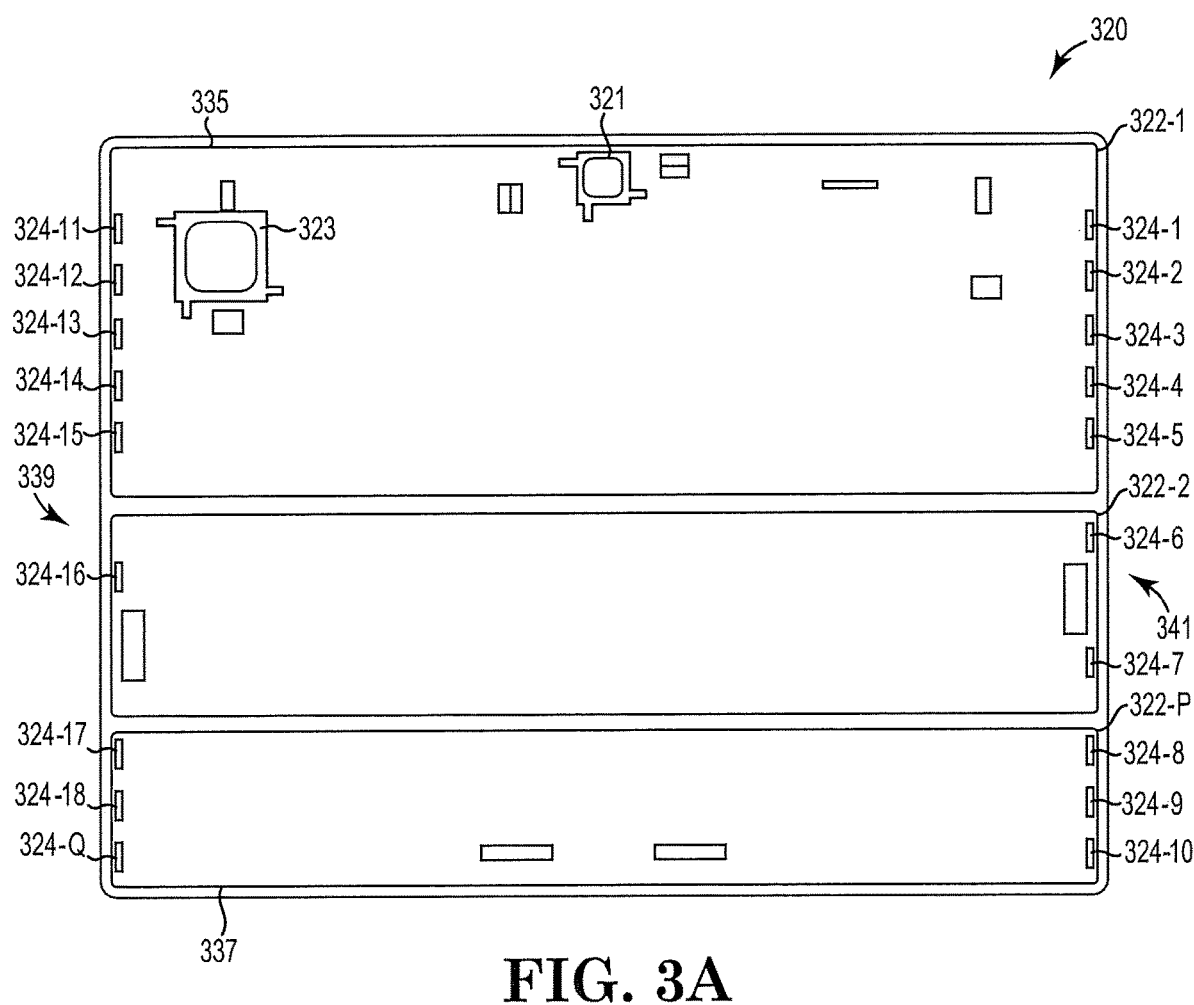
FIGS. 3A-3B illustrate example fasteners located in a portion of a flexible keyboard device and a kickstand of a portable computing device, in accordance with the present disclosure.
Figure 3B:
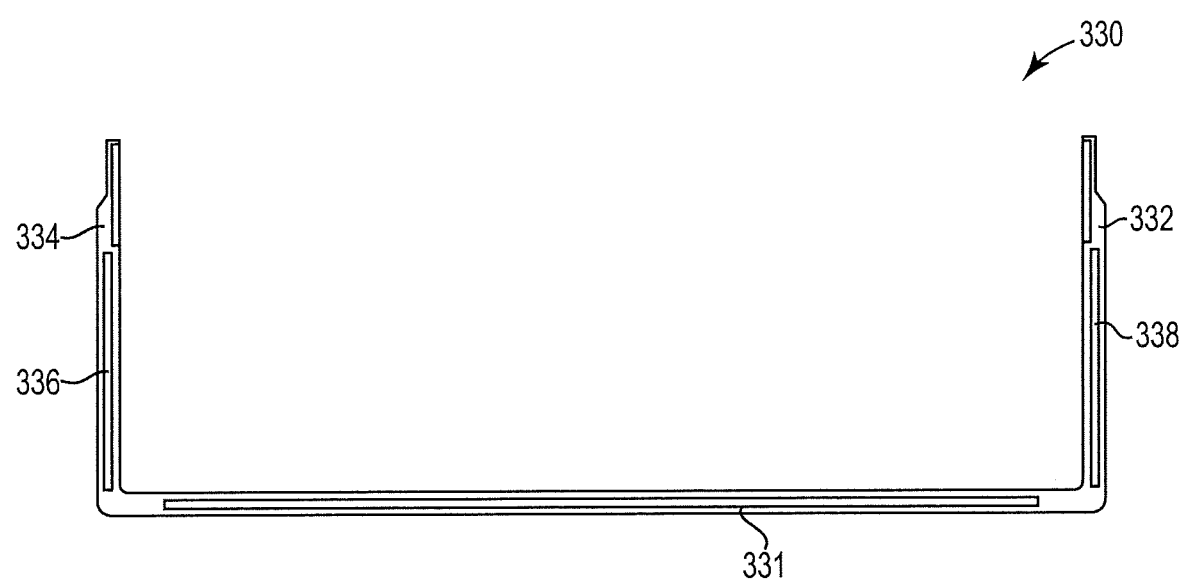

FIGS. 3A-3B illustrate example fasteners located in a portion of a flexible keyboard device and a kickstand of a portable computing device, in accordance with the present disclosure.

More specifically, FIG. 3A illustrates an example of a second flexible portion 320 of a flexible keyboard device, such as the flexible keyboard device previously described in connection with FIG. 1. The second flexible portion 320 includes a front side (which is illustrated), a back side opposite the front side (not illustrated). Each of the front side and back side include a top 335, a bottom 337, and a first and second perimeter edges 339, 341.

The second flexible portion 320 includes a plurality of fasteners. For example, a first array of fasteners 324-1, 324-2, 324-3, 324-4, 324-5, 324-6, 324-7, 324-8, 324-9, 324-10 are located proximal to the first perimeter edge 341. A second array of fasteners 324-11, 324-12, 324-13, 324-14, 324-15, 324-16, 324-17, 324-18, 324-Q are located proximal to the second perimeter edge 339 (herein sometimes generally referred to as "the first and second array of fasteners 324" for ease of reference). As previously described, the first and second array of fasteners 324 couple to the kickstand of a portable computing device to provide an opposing force between the first flexible portion and the second flexible portion 320 while the kickstand is disposed at one of a plurality of variable support angles.

In various examples, the kickstand may be disposed at an additional angle such that the kickstand is flat against the backside of the portable computing device. In such examples, the second flexible portion 320 may be coupled to the backside of the portable computing device, such that the flexible keyboard device acts as a cover to the portable computing devices. The second flexible portion 320 may include an aperture, such as the apertures 321, 323. A first aperture 321 may be positioned proximal to a camera component of the portable computing device and/or a second aperture 323 may be positioned proximal to another input component of the portable computing device. The apertures 321, 323 may provide access to the camera component and/or other input component.

As previously described, different subsets of the first and second array of fasteners 324 may couple to the kickstand when the kickstand is disposed at different support angles of the plurality of variable support angles. In some specific examples, the second flexible portion 320 incudes a plurality of partitioned sections or plates 322-1, 322-2, 322-P that are connected together and are contiguous with respect to one another. Each of the partitioned sections or plates 322-1, 322-2, 322-P includes subsets of the first and second array of fasteners 324. As a specific example, when the kickstand is disposed at the first support angle, as illustrated by FIG. 2A, the fasteners in the first and second partitioned sections or plates 322-P, 322-2 are coupled to the kickstand. When the kickstand is disposed at the second support angle, as illustrated by FIG. 2B, the fasteners in the third partitioned section or plate 322-1 are coupled to the kickstand. Although examples are not so limited and the second flexible portion 320 may include additional or fewer partitioned sections or plates and/or fasteners than illustrated by FIG. 3A. Additionally, one of the plurality of variable support angles may be associated with each of the plurality of fasteners being coupled to the kickstand.

FIG. 3B illustrates an example of a kickstand of a portable computing device. The kickstand 330 has a first arm 332 and a second arm 334. The first and second arms 332, 334 may be coupled to the backside of the portable computing device and may pivot about a hinge. The kickstand 330 further includes crossbar 331 coupled between the first arm 332 and the second arm 334. As previously described, the first arm 332 and second arm 334 include metal and/or magnetic plates 336, 338 to selectively couple to the first array and second array of fasteners of the second flexible portion. And, the first array and second array of fasteners may couple to the kickstand at a plurality of locations of the magnetic plates 336, 338 to provide the opposing force while the kickstand 330 is disposed at the plurality of variable support angles. The second flexible portion, such as illustrated by FIG. 3A, may be wrapped around the kickstand 330 and which couples the plurality of fasteners to the kickstand 330.

Figure 4:
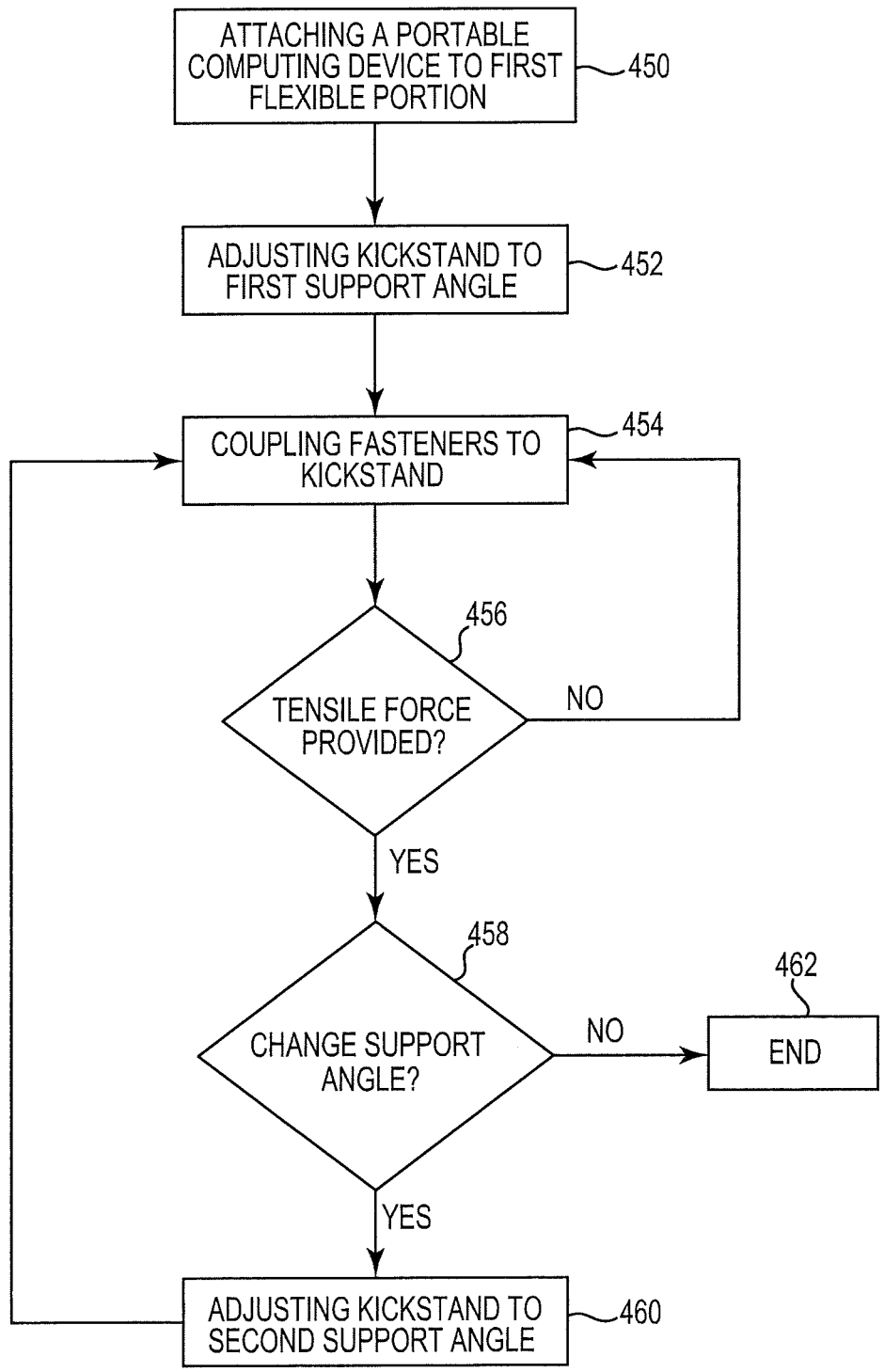
FIG. 4 illustrates an example method for coupling a flexible keyboard device to a portable computing device, in accordance with the present disclosure.

FIG. 4 illustrates an example method for coupling a flexible keyboard device to a portable computing device, in accordance with the present disclosure. At 450, the method includes attaching a portable computing device to a connector disposed on a first flexible portion of a flexible keyboard device. The first flexible portion includes a keyboard having a set of input keys disposed thereon and circuitry coupled to the set of input keys, as previously described in connection with FIG. 1.

At 452, the method includes adjusting a kickstand of the portable computing device to a first support angle with respect to a side of the portable computing device. And, at 454, the method includes coupling a first array of fasteners and a second array of fasteners of a second flexible portion of the flexible keyboard device to the kickstand while disposed at the first support angle, thereby, providing a first opposing force between the first flexible portion and the second flexible portion. As previously described, the second flexible portion is connected to the first flexible portion. In various examples, at 456, a determination is made on whether or not a tensile force is provided by the first opposing force. If not, the method includes recoupling the first array of fasteners and the second array of fasteners of the second flexible portion of the flexible keyboard device, at 454. If a tensile force is provided, at 458, a determination is made on whether or not the support angle is to be changed. The determination may include a decision to adjust the support angle. If not, at 462, the method is complete.

If yes, at 460, the method further includes adjusting the kickstand to a second support angle with respect to the side of the portable computing device. At 454, the method includes coupling the first array of fasteners and the second array of fasteners of the second flexible portion of the flexible keyboard device to the kickstand while disposed at the second support angle, thereby, providing a second opposing force between the first flexible portion and the second flexible portion. In various specific examples, coupling the first array and second array of fasteners to the kickstand while disposed at the first and second support angles further includes adjusting a location of the first and second array of fasteners with respect to the kickstand until the tensile force is provided between the second flexible portion and the first flexible portion. Changing between the first support angle and the second support angle may include un-attaching the first and second arrays of fasteners from the kickstand and then recoupling at a different position.

In a number of specific examples, coupling the first array of fasteners and the second array of fasteners to the kickstand while disposed at the first support angle includes coupling a first subset of the first array of fasteners and the second array of fasteners to the kickstand. And, coupling the first array of fasteners and the second array of fasteners to the kickstand while disposed at the second support angle includes coupling a second subset of the first array of fasteners and the second array of fasteners to the kickstand. In such examples, the first and second opposing forces are proportional to a number of fasteners in the first and second subsets of first array and the second array coupled to the kickstand.

Terms to exemplify orientation, such as upper/lower, left/right, top/bottom and above/below, may be used herein to refer to relative positions of elements as shown in the figures. It should be understood that the terminology is used for notational convenience and that in actual use the disclosed structures may be oriented different from the orientation shown in the figures. Thus, the terms should not be construed in a limiting manner.

Various terminology as used in the Specification, including the claims, connote a plain meaning in the art unless otherwise indicated. As examples, the Specification describes and/or illustrates aspects useful for implementing the claimed disclosure by way of various structure, such as circuits or circuitry selected or designed to carry out specific acts or functions, as may be recognized in the figures or the related discussion as depicted by or using terms such as blocks, modules, device, system, unit, controller, communication circuitry and/or other examples. It will also be appreciated that certain of these blocks may also be used in combination to exemplify how operational aspects have been designed and/or arranged. Whether alone or in combination with other such blocks or circuitry including discrete circuit elements such as transistors, resistors, these above-characterized blocks may be circuits coded by fixed design and/or by configurable circuitry and/or circuit elements for carrying out such operational aspects. In certain examples, such a programmable circuit refers to or includes computer circuits, including memory circuitry for storing and accessing a set of program code to be accessed/executed as instructions and/or configuration data to perform the related operation. Depending on the data-processing application, such instructions and/or data may be for implementation in logic circuitry, with the instructions as may be stored in and accessible from a memory. Such instructions may be stored in and accessible from a memory via a fixed circuitry, a limited group of configuration code, or instructions characterized by way of object code.

Where the Specification may make reference to a "first array of fasteners", a "second array of fasteners", etc., where the adjectives "first" and "second" are not used to connote any description of the structure or to provide any substantive meaning; rather, such adjectives are merely used for English-language antecedence to differentiate one such similarly-named structure from another similarly-named structure.

Various modifications and changes may be made to the above description without strictly following the examples and applications illustrated and described herein. For example, methods as exemplified in the Figures may involve processes carried out in various orders, with other aspects of the examples herein retained, or may involve fewer or more processes. Such modifications do not depart from the scope of various aspects of the disclosure, including aspects set forth in the claims.

What is claimed is:

1. An apparatus comprising:
    a first flexible portion including a keyboard having a set of input keys disposed thereon and circuitry coupled to the set of input keys, the first flexible portion to couple to a portable computing device proximal to a display side of the portable computing device; and
    a second flexible portion connected to the first flexible portion to form a flexible keyboard device and having a plurality of fasteners to couple to a kickstand of the portable computing device, the first and second flexible portions to provide an opposing force there between while the kickstand is disposed at one of a plurality of variable support angles, wherein the plurality of fasteners include a first array of fasteners located along a first perimeter edge of the second flexible portion and a second array of fasteners located along a second perimeter edge of the second flexible portion, the first array of fasteners and second array of fasteners being disposed on a same side of the flexible keyboard device as the keyboard when the flexible keyboard device is flat and uncoupled to the kickstand of the portable computing device.

2. The apparatus of claim 1, wherein the first array of fasteners and second array of fasteners to couple to the kickstand of the portable computing device at a plurality of locations to provide the opposing force and resistance to pressure while the kickstand is disposed at a first support angle and a second support angle of the plurality of variable support angles, the same side of the flexible keyboard device being associated with a front side of the first flexible portion.

3. The apparatus of claim 1, wherein the plurality of fasteners include magnets to couple to magnetic plates within the kickstand of the portable computing device, and the first and second flexible portions are nonplanar responsive to the second flexible portion being coupled to the kickstand.

4. The apparatus of claim 1, wherein the first flexible portion includes a connector disposed along and parallel to a top of the first flexible portion and to pivotally couple to a perimeter edge of the display side of the portable computing device such that the portable computing device is to pivot while coupled to the connector and while the kickstand of the portable computing device is disposed at the plurality of variable support angles, wherein the connector is disposed perpendicular to the plurality of fasteners which are disposed along the first and second perimeter edges of the second flexible portion.

5. The apparatus of claim 1, wherein the first flexible portion further includes communication circuitry to communicate input data, responsive to user inputs via the set of input keys, to the portable computing device, and the first and second flexible portions are contiguous.

6. The apparatus of claim 1, wherein the second flexible portion includes an aperture positioned proximal to a camera component of the portable computing device, wherein a first subset of the plurality of fasteners are coupled to the kickstand of the portable computing device while the kickstand is disposed at a first support angle of the plurality of variable support angles and a second subset of the plurality of fasteners are coupled to the kickstand of the portable computing device while the kickstand is disposed at a second support angle of the plurality of variable support angles.

7. The apparatus of claim 1, wherein the second flexible portion includes an aperture positioned proximal to an input component of the portable computing device.

8. The apparatus of claim 1, wherein the second flexible portion couples to the kickstand of the portable computing device while the kickstand is disposed at a first support angle and a second support angle of the plurality of variable support angles, and an additional angle in which the kickstand is flat against a backside of the portable computing device, the backside being opposite the display side.

9. The apparatus of claim 1, wherein the second flexible portion is coupled to the kickstand of the portable computing device while the kickstand is disposed at the one of the plurality of variable support angles to provide resistance to pressure on the portable computing device while the first flexible portion is located on a non-flat surface.

10. An apparatus comprising:
a first flexible portion and a second flexible portion connected thereto to form a flexible keyboard device, each of the first and second flexible portions having a front side, a backside, a top, a bottom, and first and second perimeter edges;
the first flexible portion including a keyboard having a set of input keys disposed on the front side and circuitry coupled to the set of input keys, and to couple to a portable computing device proximal to the front side of the first flexible portion and a display side of the portable computing device; and
the second flexible portion having a first array of fasteners located along the first perimeter edge of the second flexible portion and a second array of fasteners located along the second perimeter edge of the second flexible portion, the first array of fasteners and second array of fasteners to couple to a kickstand of the portable computing device proximal to a backside of the portable computing device, the backside being opposite the display side, and to provide an opposing force between the first flexible portion and the second flexible portion while the kickstand of the portable computing device is disposed at one of a plurality of variable support angles, wherein the first array of fasteners and the second array of fasteners are disposed along a same side of the flexible keyboard device as the keyboard when the flexible keyboard device is flat and uncoupled to the kickstand of the portable computing device, the same side of the flexible keyboard device being associated with the front side of the first flexible portion.

11. The apparatus of claim 10, wherein the first and second flexible portions are connected at the top of the first flexible portion and the bottom of the second flexible portion to form the flexible keyboard device, the bottom of the second flexible portion being perpendicular to the first perimeter edge and the second perimeter edge when the flexible keyboard device is flat and the first array of fasteners and second array of fasteners are uncoupled to the kickstand, and the apparatus further includes the portable computing device having:
the display side; and
the backside including the kickstand, the kickstand having a first arm and a second arm coupled to the backside of the portable computing device and the kickstand to pivot about a hinge, and having a crossbar coupled between the first arm and the second arm, the first arm and second arm including magnetic plates to selectively couple to the first array and second array of fasteners of the second flexible portion, the first array and second array of fasteners being coupled to the kickstand at a plurality of locations of the magnetic plates to provide the opposing force while the kickstand is disposed at the plurality of variable support angles.

12. The apparatus of claim 10, wherein the first array and second array of fasteners include a first array of magnets located along the first perimeter edge and a second array of magnets located along the second perimeter edge of the second flexible portion, and the first array of magnets and the second array of magnets are disposed on the same side of the flexible keyboard device as the keyboard when the flexible keyboard device is flat and uncoupled to the kickstand of the portable computing device.

13. An apparatus comprising:
a first flexible portion including a keyboard having a set of input keys disposed thereon and circuitry coupled to the set of input keys, the first flexible portion including a connector to pivotally couple to a display side of a portable computing device;
a second flexible portion coupled to the first flexible portion to form a flexible keyboard device, the second flexible portion having a first array of fasteners located proximal to a first perimeter edge and a second array of fasteners located proximal to a second perimeter edge, the first array of fasteners and second array of fasteners to couple to a kickstand of the portable computing device at a plurality of locations and to:
provide a first opposing force between the first flexible portion and the second flexible portion while coupled to the kickstand of the portable computing device and while the kickstand is disposed at a first support angle of a plurality of variable support angles, wherein a first subset of first array of fasteners and the second array of fasteners are coupled to the kickstand of the portable computing device while the kickstand is disposed at the first support angle; and
provide a second opposing force between the first flexible portion and the second flexible portion while coupled to kickstand of the portable computing device and while the kickstand is disposed at a second support angle of the plurality of variable support angles, wherein a second subset the first array of fasteners and the second array of fasteners are coupled to the kickstand while the kickstand is disposed at the second support angle, and the first and second opposing forces are proportional to a number of fasteners in the first subset and the second subset of the first array and the second array coupled to the kickstand.

14. The apparatus of claim 13, wherein the first array and second array of fasteners are coupled to the kickstand of the portable computing device while the kickstand is disposed at the first and second support angles at different locations of the kickstand and to provide a tensile force between the second flexible portion and the first flexible portion.

15. The apparatus of claim 13, further including a connector disposed along a top of the first flexible portion, the top of the first flexible portion being proximal to the second flexible portion and perpendicular to the first and second perimeter edges of the second flexible portion having the first array of fasteners and the second array of fasteners.

16. The apparatus of claim 15, further including the portable computing device having the kickstand, the kickstand including a first arm and a second arm coupled to a backside of the portable computing device and a crossbar coupled between the first arm and the second arm, the first arm and second arm including magnetic plates to selectively couple to the first array and second array of fasteners of the second flexible portion, and
wherein the flexible keyboard device couples to the portable computing device via:
the connector coupled at a perimeter edge of the portable computing device and proximal to a display side of the portable computing device, and
the first array and second array of fasteners of the second flexible portion coupled to the first arm and second arm of the kickstand of the portable computing device and proximal to a back side of the portable computing device, the back side being opposite the display side.

17. The apparatus of claim 1, wherein the flexible second portion is to couple to the kickstand of the portable computing device while the kickstand of the portable computing device is disposed at each of the plurality of variable support angles.

18. The apparatus of claim 1, wherein the opposing force between the first flexible portion and the second flexible portion is to stabilize a position of the portable computing device while the portable computing device is on a non-flat surface.

19. The apparatus of claim 10, wherein the flexible keyboard device is to support the portable computing device via the opposing force between the first flexible portion and the second flexible portion, and while the first flexible portion is located on a non-flat surface.

\* \* \* \* \*